United States Patent Office

3,591,633
Patented July 6, 1971

3,591,633
NOVEL PROCESS
Henri Ulrich, North Branford, Conn., assignor to The Upjohn Company, Kalamazoo, Mich.
No Drawing. Filed Sept. 17, 1968, Ser. No. 760,355
Int. Cl. C07c 127/00
U.S. Cl. 260—553                                 3 Claims

ABSTRACT OF THE DISCLOSURE

The chlorination of N,N'-diphenylurea to give bis(2,4,6-trichlorophenyl)urea is effected in high yield and with facile separation of product, by employing an inert aprotic solvent as reaction medium (N,N-dialkylalkanoamides such as dimethylformamide are preferred). The bis(2,4,6-trichlorophenyl)urea is an intermediate for the known N,N' - dichloro - bis(2,4,6 - trichlorophenyl)urea, an antivessicant.

BACKGROUND OF THE INVENTION (1) Field of the invention

This invention relates to an improved chlorination process and is more particularly concerned with an improved method of chlorinating N,N'-diphenylurea to obtain bis (2,4,6-trichlorophenyl)urea.

(2) Description of the prior art

Bis(2,4,6-trichlorophenyl)urea is the penultimate intermediate in the preparation of N,N'-dichloro-bis(2,4,6-trichlorophenyl)urea, a known antivessicant; see, for example, U.S. Pat. 2,936,322. The method of preparation of bis(2,4,6-trichlorophenyl)urea described in the latter patent requires chlorination of aniline to yield 2,4,6-trichloroaniline, phosgenation of the latter to yield the corresponding 2,4,6-trichlorophenyl isocyanate, and condensation of the latter with a further mole of 2,4,6-trichloroaniline to yield the desired urea.

A much simpler route to bis(2,4,6-trichlorophenyl)urea consists in the reaction of phenyl isocyanate with aniline to give N,N'-diphenylurea followed by chlorination of the latter to give the desired bis(2,4,6-trichlorophenyl)urea directly. However, the latter chlorination has not been commercially feasible hitherto. For example, Chattaway et al., Berichte 34, 1073 (1901) described the chlorination of N,N'-diphenylurea. The authors employed hot glacial acetic acid as reaction medium and a reaction time of several days. They obtained the desired compound in unspecified yield but their operating conditions clearly do not lend themselves readily to commercial production. Kutepov et al., Chemical Abstracts 59, 3784 (1963) carried out the chlorination under similar conditions i.e. glacial acetic acid at 75 to 80° C. as the reaction medium with a reaction time of 40 hours. The major product (65 to 75 percent yield) which these authors isolated was heptachlorocyclohexanone.

I have now found that the chlorination of N,N'-diphenylurea to bis(2,4,6-trichlorophenyl)urea can be carried out readily and in high yield by employing certain solvents as the reaction medium.

SUMMARY OF THE INVENTION

My invention comprises an improved process for the preparation of bis(2,4,6-trichlorophenyl)urea by the reaction of N,N'-diphenylurea with chlorine wherein the improvement comprises carrying out the chlorination in the presence of an inert aprotic solvent.

DETAILED DESCRIPTION OF THE INVENTION

The essence of my invention lies in the use of certain solvents, namely inert aprotic solvents, as reaction media in the chlorination of N,N'-diphenylurea. Aprotic polar solvents are a particular class of solvents well-recognized in the art; see, for example, Parker, Quarterly Reviews, 16, 163, 1962. The term "inert" which I use to qualify the solvents employed in the process of the invention means that said solvent is inert under the conditions of the reaction i.e. does not enter into reaction with either of the reactants employed in the process or interfere in any way with the desired progress of the chlorination. Illustrative of inert aprotic polar solvents are N,N'-di(lower-alkyl) aliphatic hydrocarbon carboxylic acid amides such as N,N-dimethylformamide, N,N-diethylformamide, N,N-dimethylacetamide, N,N-diethylacetamide, N,N-dimethylpropionamide, N,N - diethylbutyramide, N,N - dipropyllauramide, N,N - diethyldecanamide, N,N - dihexylformamide, and the like; N,N,N',N'-tetra(lower-alkyl)ureas such as N,N,N',N' - tetramethylurea, N,N,N',N' - tetraethylurea N,N - dimethyl - N',N'-dihexylurea, N,N-diisopropyl-N',N'-dimethylurea, and the like; N-(lower-alkyl)-2 - pyrrolidones such as N - methyl-2-pyrrolidone, N-isopropyl - 2 - pyrrolidone, N - pentyl-2-pyrrolidone, N-isohexyl-2-pyrrolidone, and the like; and hexamethylphosphoramide.

In carrying out the process of the invention, the N,N'-diphenylurea starting material is dissolved or suspended in the inert aprotic polar solvent. The amount of the latter employed is not critical. However, in the interest of economy the amount of aprotic polar solvent is kept as low as possible and can be employed in an amount as low as 100 parts per 10 parts of N,N'-diphenylurea. The upper limit of amount of solvent employed is dictated solely by considerations of economy and difficulty of handling unnecessarily large amounts of solvent.

The mixture of aprotic polar solvent and N,N'-diphenylurea is then treated with chlorine advantageously by bubbling gaseous chlorine into the mixture of urea and solvent. Alternatively, but less preferably, the chlorine is added as a solution in aprotic polar solvent.

The reaction is preferably carried out at ambient temperatures (circa 25° C.) without the application of any external heat. If desired, however, the reaction can be carried out at temperatures within the range of about 25° C. to about 100° C. depending upon the particular rate of chlorination desired and the particular aprotic solvent employed.

The reaction is continued until substantially the theoretical quantity (6 atoms per mole of N,N-diphenylurea) of chlorine has been taken up by the reaction mixture. An excess of chlorine, up to about 8 atoms per mole of N,N-diphenylurea, can be employed if desired without deleterious effect on the yield or purity of product. When this point in the reaction has been reached, the bulk of the desired bis(2,4,6-trichlorophenyl)urea end product has separated as a crystalline solid from the reaction mixture. Accordingly, the isolation of the desired bis(2,4,6-trichlorophenyl)urea presents no problem. Simple filtration, and like methods of isolating solids from suspension, will suffice to separate the product which is generally in a state of purity such that no additional purification is necessary. If desired, however, further purification can be effected by recrystallization, solvent washing, and like conventional techniques.

The improved process of the invention gives the desired bis(2,4,6-trichlorophenyl)urea in high yield (in excess of 80 percent theoretical) and in a high state of purity. Further, the facile separation of the desired product from the reaction mixture lends added attraction to this route to the above compound as an intermediate for conversion to the corresponding N,N'-dichloro compound. Additionally, the above described route to bis(2,4,6-trichlorophenyl)urea has the advantage that the starting N,N'-diphenylurea can be prepared in situ in the reaction vessel by reaction of stoichiometric quantities of phenyl isocyanate and aniline.

The following example describes the manner and process of making and using the invention and sets forth the best mode contemplated by the inventor of carrying out the invention but is not to be construed as limiting.

EXAMPLE 1

A total of 60 g. (0.85 mole) of chlorine was passed slowly over a period of two hours into a solution of 21.2 g. (0.1 mole) of N,N'-diphenylurea in 500 ml. of dimethylformamide. The temperature of the reaction mixture was within the range of 27 to 30° C. during the chlorination. After the introduction of chlorine had ceased, the reaction mixture was stirred for a further two hours and the solid which had separated was then isolated by filtration, washed with dimethylformamide and dried. There was thus obtained 34.05 g. (81.5 percent theoretical yield based on N,N'-diphenylurea) of bis(2,4,6-trichlorophenyl)urea having a melting point of 324 to 328° C.

*Analysis.*—Calcd. for $C_{13}H_6Cl_6N_2O$ (percent): Cl, 50.8. Found (percent): Cl, 50.0.

Using the above procedure but replacing dimethylformamide by N,N-dimethylacetamide, N,N,N',N'-tetramethylurea, N-methyl-2-pyrrolidone or hexamethylphosphoramide there was obtained bis(2,4,6-trichlorophenyl)urea in substantially the same yield and state of purity.

I claim:
1. In a process for the preparation of bis(2,4,6-trichlorophenyl)urea by the reaction of N,N'-diphenylurea with chlorine, the improvement which comprises carrying out the chlorination in the presence of an inert aprotic polar solvent at a temperature from about 25° C. to about 100° C.
2. The process of claim 1 wherein the inert aprotic organic solvent is an N,N-di(lower-alkyl)-alkanoamide.
3. The process of claim 1 wherein the inert aprotic organic solvent is N,N-dimethylformamide.

References Cited

UNITED STATES PATENTS 2,973,386   2/1961   Weldon _____ 260—553

OTHER REFERENCES

Adams et al.: J. Am. Chem. Soc., vol. 74, pp. 3171–3173 (June 30, 1952).

Morrison and Boyd: Organic Chemistry, Allyn and Bacon Inc., Boston (1966), 2nd ed., p. 346.

BERNARD HELFIN Primary Examiner

M. W. GLYNN, Assistant Examiner